US012553538B2

(12) United States Patent
Sakthivel et al.

(10) Patent No.: US 12,553,538 B2
(45) Date of Patent: Feb. 17, 2026

(54) MONITORING CONDITION OF A VALVE PLUG IN A VALVE

(71) Applicant: Dresser, LLC, Houston, TX (US)

(72) Inventors: Navin Sakthivel, Spring, TX (US); Cyril Vlassoff, Saint-Georges des Groseillers (FR); Mikhail Anisimov, Houston, TX (US); Stanley Amirthasamy, Houston, TX (US); George Dodan, Saint Johns, FL (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 18/070,685

(22) Filed: Nov. 29, 2022

(65) Prior Publication Data

US 2024/0175518 A1 May 30, 2024

(51) Int. Cl.
*F16K 37/00* (2006.01)
*F16K 1/36* (2006.01)

(52) U.S. Cl.
CPC ............ *F16K 37/0041* (2013.01); *F16K 1/36* (2013.01)

(58) Field of Classification Search
CPC ................................ F16K 37/0041; F16K 1/36
See application file for complete search history.

(56) References Cited

U.S. PATENT DOCUMENTS

| | | | | |
|---|---|---|---|---|
| 1,111,391 A | * | 9/1914 | Kneass | F16K 1/482 251/86 |
| 4,481,809 A | * | 11/1984 | LaBate | G01N 17/00 266/99 |
| 4,578,669 A | * | 3/1986 | Woods | G08B 26/002 340/505 |
| 5,197,508 A | * | 3/1993 | Gottling | F16K 11/04 251/129.08 |
| 8,072,711 B1 | * | 12/2011 | Wang | G01R 33/093 360/324 |
| 8,515,880 B2 | | 8/2013 | Holley et al. | |
| 10,086,720 B2 | * | 10/2018 | Dankbaar | B60N 2/665 |

(Continued)

FOREIGN PATENT DOCUMENTS

EP 0296808 A1 12/1988
GB 2286349 A 8/1995

(Continued)

OTHER PUBLICATIONS

G. Thompson, G. Zolkiewski, "An experimental investigation into the detection of internal leakage of gases through valves by vibration analysis," Journal of Process Mechanical Engineering (Aug. 1997).

(Continued)

*Primary Examiner* — Angelisa L. Hicks
(74) *Attorney, Agent, or Firm* — Paul Frank + Collins P.C.

(57) ABSTRACT

A monitoring unit is configured for use on a valve. These configurations may include sensors that can generate data consistent with physical condition of a closure member, like a valve "plug," when the valve is in service on a process line. Analysis of this data may indicate erosion on the plug that is often due to highly-erosive working fluids or other process (or application) conditions. Signals or alerts from the process control system, or DCS, may alert operators to perform timely maintenance that avoids problems that may arise as a result of physical changes in the valve plug.

14 Claims, 7 Drawing Sheets

(56) References Cited

U.S. PATENT DOCUMENTS

| | | | |
|---|---|---|---|
| 2008/0092960 A1* | 4/2008 | Manecke | F16K 37/0033 |
| | | | 137/554 |
| 2016/0223089 A1 | 8/2016 | Nijland | |
| 2018/0335790 A1* | 11/2018 | Imsland | G05D 7/0635 |
| 2019/0223089 A1 | 7/2019 | Salgueiro et al. | |
| 2019/0264832 A1 | 8/2019 | Giove | |
| 2020/0157309 A1 | 5/2020 | El-Hibri | |
| 2021/0332669 A1 | 10/2021 | Joseph et al. | |
| 2022/0176783 A1 | 6/2022 | Huebner et al. | |

FOREIGN PATENT DOCUMENTS

| | | |
|---|---|---|
| WO | 2002017028 A1 | 2/2002 |
| WO | 2020132085 A1 | 6/2020 |

OTHER PUBLICATIONS

Masoneilan 7400 Series Erosion Resistant Control Valves, Baker Hughes Company (2021).
Masoneilan 74000 Series Erosion Resistant Valves (technical manual), Baker Hughes Company (2021).

* cited by examiner

MONITORING CONDITION OF A VALVE PLUG IN A VALVE

BACKGROUND

Flow controls play a large role in many industrial facilities. Power plants and industrial process facilities, for example, use different types of flow controls to manage flow of a material, typically fluids, throughout vast networks of pipes, tanks, generators, and other equipment. Control valves are useful to accurately regulate flow to meet process parameters. In oil and gas industry, operators may deploy control valves to control flow of debris-entrained fluids in hydrocracking or related processes. However, fluids in these processes are known to be highly-erosive. The materials may cause parts of the valve found directly in the flow to degrade rapidly. Operators are keen to understand wear patterns or characteristics of these parts in order to properly maintain their devices to avoid costly repairs or untimely line shut-downs.

SUMMARY

The subject matter of this disclosure relates to improvements that provide operators with data about the condition of devices on their process lines. Of particular interest are embodiments with sensors that can monitor wear of certain parts on valves or flow controls. These embodiments may provide real-time data to capture the effects of highly-erosive process fluids. As a result, operators may pre-emptively arrange for maintenance to occur at timely points of service, for example, before parts erode to such degree as to effect performance of the valve. This feature can save considerable costs because maintenance is done on devices that are near, but not at, catastrophic failure that would affect output, product quality, or even irreparably damage the process line.

DRAWINGS

This specification refers to the following drawings.

Figure 1:
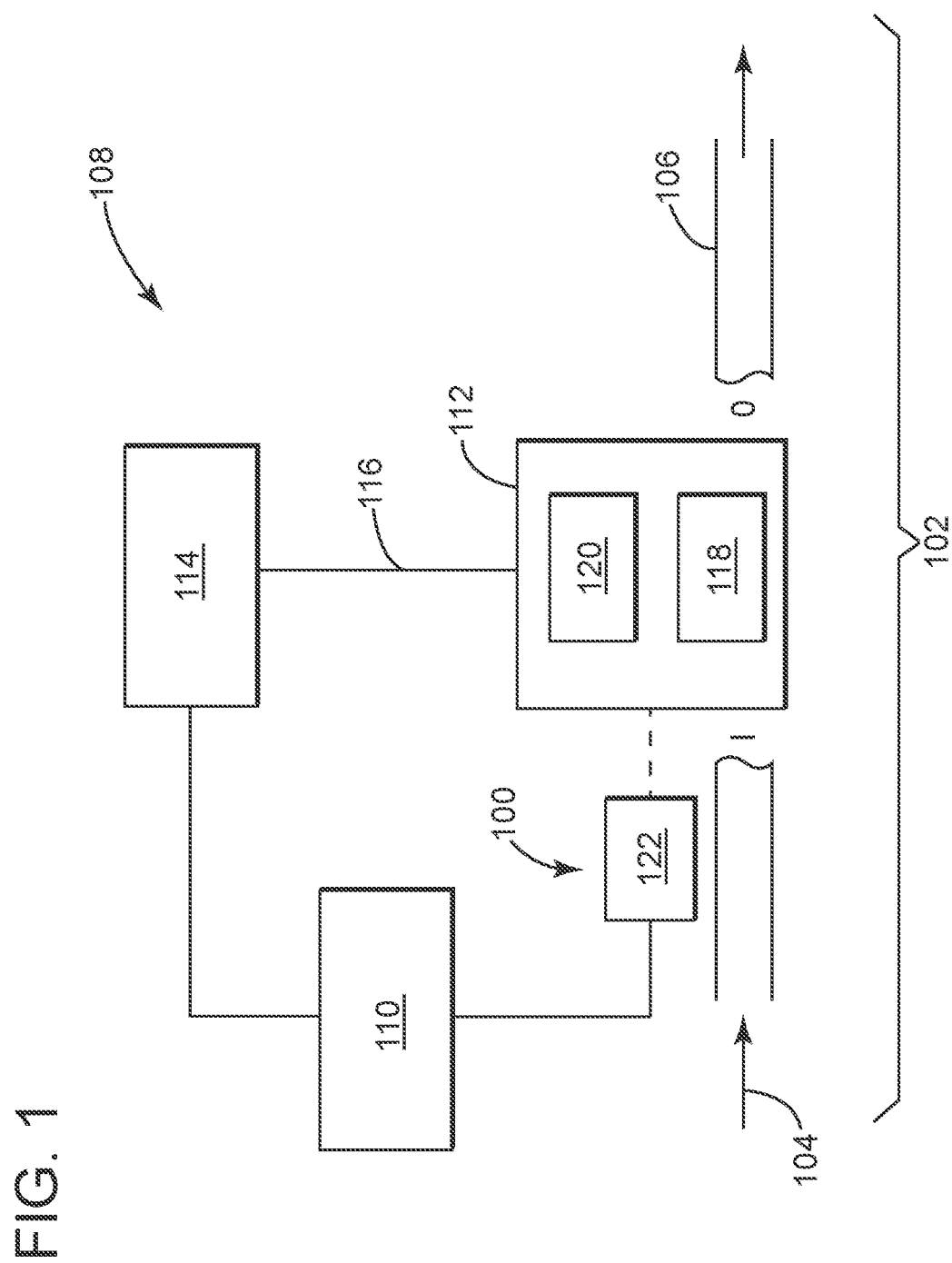
FIG. 1 depicts a schematic diagram of an embodiment of monitoring unit.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" does not exclude the existence of additional embodiments or implementations that also incorporate the recited features.

DESCRIPTION

The discussion now turns to describe features of the examples shown in the drawings noted above. These examples may embody valves, like control valves, that are setup to monitor wear of certain parts or pieces, typically in critical areas of the device. These parts may reside in locations that are generally inaccessible for ready visual inspection. For example, the proposed designs may provide quantitative data on conditions of parts that are in direct contact with flow of working fluid. The designs may offer insight not previously available through non-invasive diagnostics that a technician might perform with handheld ultrasonic equipment. Other embodiments are within the scope of this disclosure.

FIG. 1 depicts an example of a monitoring unit 100. This example is found in a distribution network 102, typically designed to carry material 104 through a network of conduit 106. The network 102 may include a flow control 108 with a valve positioner 110. It may also have a valve body 112 to connect the device in-line with the conduit 106. The valve body 112 may support an actuator 114. A valve stem 116 may couple the actuator 114 with valve mechanics, shown here to include a seat 118 and a closure member 120. In one implementation, the monitoring unit 100 may have a sensor unit 122 in proximity to the closure member 120.

Broadly, the monitoring unit 100 may be configured to generate data. These configurations may operate continuously to detect conditions that prevail in service. This data may correspond with wear, erosion, or other surface defects that can result from exposure to harsh or caustic environments that prevail in, for example, oil & gas applications. The data may provide operators with physical conditions of their devices in real-time. As a result, they can make decisions concomitant with trends that point to potential problems or issues, often before the subject part fails or starts to have an adverse effect on performance of the valve.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, compressors, vessels, boilers, and the like. The pipes may also connect to tanks or reservoirs. In many facilities, this equipment forms complex networks.

The flow control 108 may be configured to regulate flow of material 104 through the conduit 106. These configurations may embody control valves and like devices. The valve positioner 110 may be configured to process and generate signals. These configurations may connect to a control network (or "distributed control system" or "DCS"), which maintains operation of all devices on process lines to ensure that materials flow in accordance with a process. The DCS may generate control signals with operating parameters that describe or define operation of the flow control 108 for this purpose. The valve positioner 110 may have operating hardware, like electrical and computing components (e.g., processors, memory, executable instructions, etc.). These components may also include electro-pneumatic devices that operate on an incoming pneumatic supply signal to deliver a control signal, typically compressed air, at pressure that ensures the flow control 108 supplies material 104 downstream according to process parameters.

Parts of the flow control 108 may be configured to regulate flow of material 104 through the conduit 106. The valve body 112 may adopt a structure often made of cast or machined metals. This structure may form a flange at openings I, O. Adjacent pipes 106 may connect to these flanges. The actuator 114 may embody a pneumatic device. The compressed air signal may energize this device to generate a load. The valve stem 116 may embody an elongate cylinder or rod that directs this load to the valve mechanics 118, 120. This feature helps locate the closure member 120, often a "plug" made of metal or metal alloy, in a desired position relative to the seat 118. This desired position or "set point" may correspond with flow parameters for the material 104 to meet process requirements or parameters. The plug 120 may move relative to the seat 118 to meet or achieve the set point. Movement is generally along an axis of the seat 118, or "up" or "down" for those valves that orient vertically on the process line. As noted, the position of the plug 120 may correspond directly with the flow rate of natural gas (or other resource) that flows through the seat 118 (or from its upstream side to its downstream side).

The sensor unit 122 may be configured to measure conditions on the flow control 108. These configurations may include devices that are sensitive to physical conditions or changes in structure on parts, including the plug 120, that are in contact with material 104. The devices may reside inside of the flow control 108. In one implementation, the devices integrate into the structure of the valve body 112, for example, the structure that guides the plug 120. This feature provides data at locations that are in close proximity to surfaces on the plug 120 that are exposed to material 104. As a result, the data may clearly reflect physical conditions of (or on) the plug 120 that may be precursor to broader failures or issues on the flow control 108. Erosion of the plug 120, for example, may lead to changes in flow rate that are outside of process parameters, even though the plug 120 may reside at its desired position.

Figure 2:
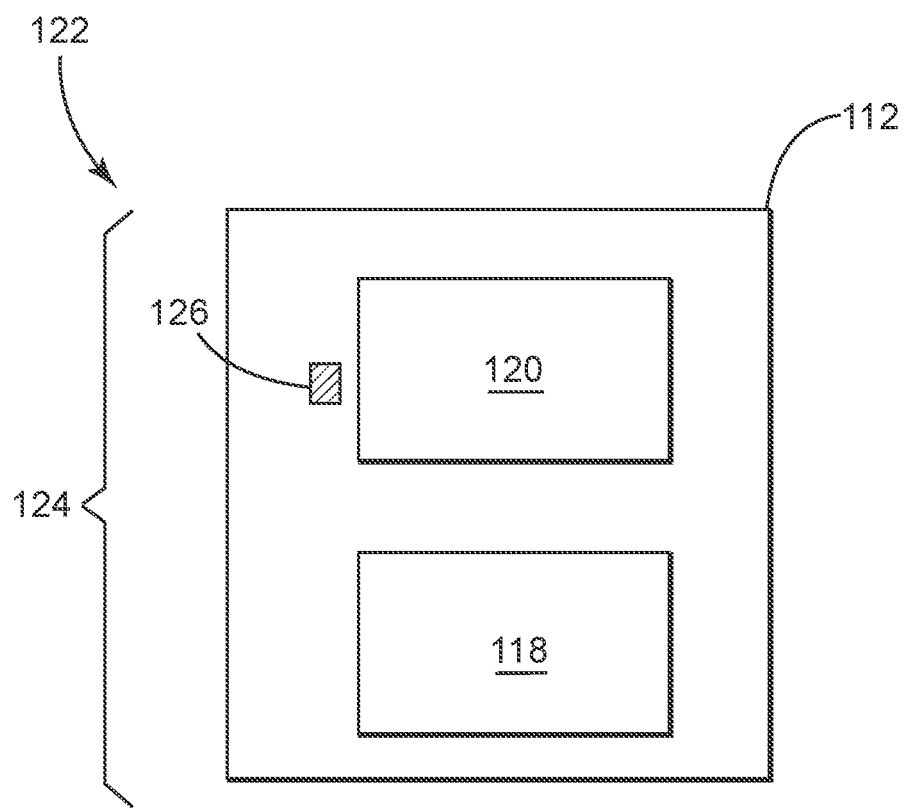
FIG. 2 depicts a schematic diagram of an example of a sensor unit for the monitoring unit of FIG. 1.
Figure 3:
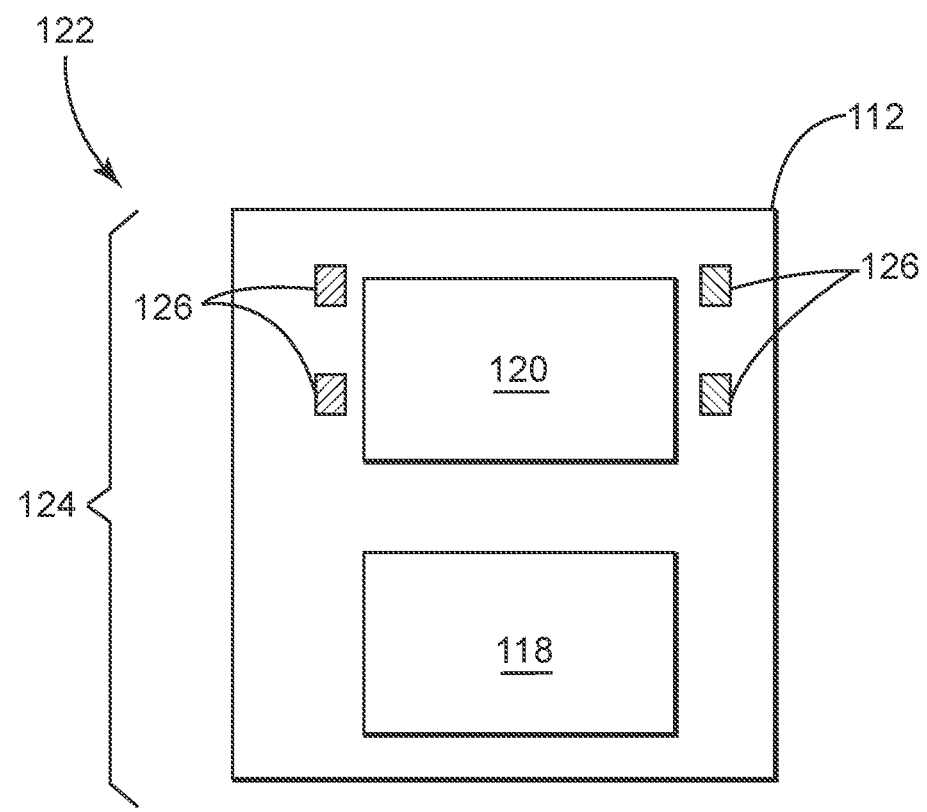
FIG. 3 depicts a schematic diagram of an example of a sensor unit for the monitoring unit of FIG. 1.
Figure 4:
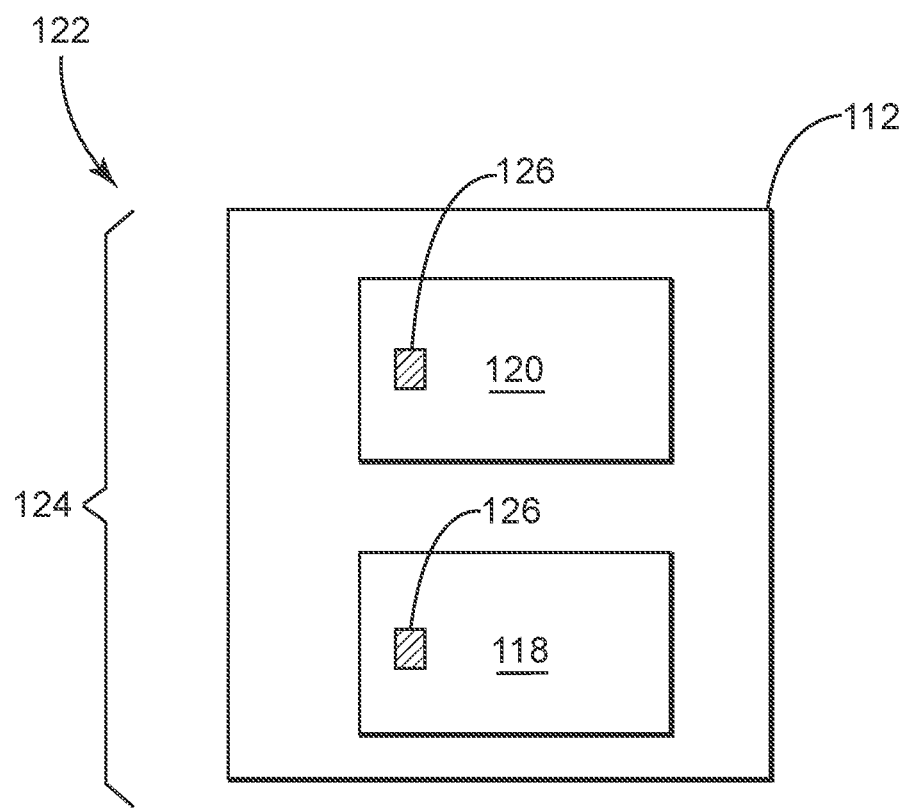
FIG. 4 depicts a schematic diagram of an example of a sensor unit for the monitoring unit of FIG. 1.

FIGS. 2, 3, and 4 depict a schematic diagram of the sensor unit 122. This structure may form a sensing array 124 that populates part of the valve body 112. The sensing array 124 may include a sensing location 126 that can generate data, for example, that relates to the plug 120. As best shown in FIG. 3, an arrangement for the sensing array 124 may include more than one sensing location 126, as well. Data from these arrangements may describe features or properties of the plug 120, like conditions of the surface or material composition. Processing of the data may, in turn, identify problems or potential problems with the device. These processes may allow operators to schedule maintenance to avoid changes in flow through the control valve 108 that might disrupt production or, worse, lead to catastrophic failure that might shut-down the process line altogether. This feature can provide data across more points of interest on the closure member 120. FIG. 4 depicts an example with the sensing location 126 disposed on the plug 120 (or the seat 118).

Figure 5:
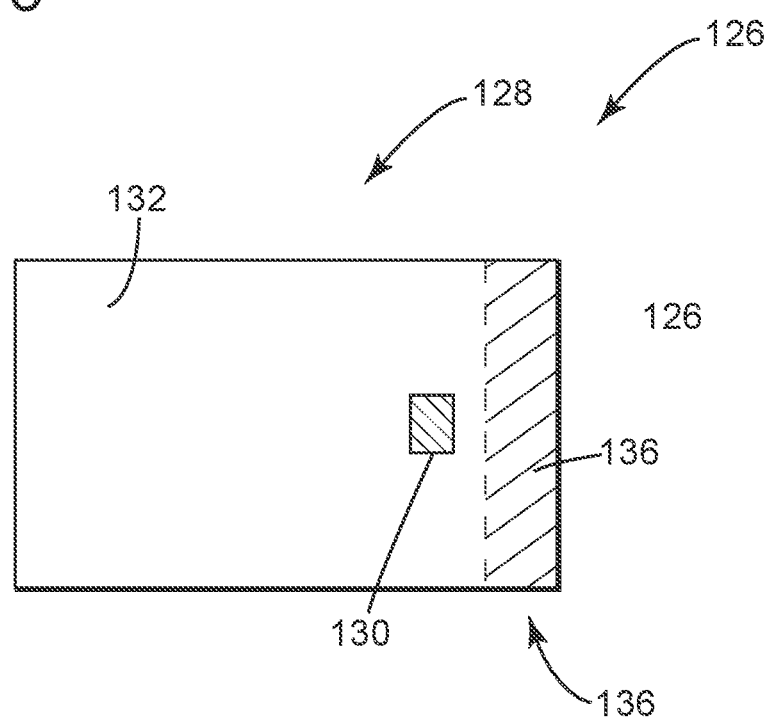
FIG. 5 depicts a schematic diagram of an example of a sensor for use in the sensor units of FIGS. 2 and 3.

FIG. 5 depicts an elevation view of the cross-section of exemplary structure for the sensing location 126. This structure may include a sensor 128 with a property-sensitive device 130, for example, a Hall effect sensor or linear variable differential transformer ("LVDT") sensor. This disclosure contemplates other types of technologies as well. Non-contact sensors may provide useful because they will not interfere with movement of parts, like the plug 120. These sensors may include magnetic flux leakage ("MFL") sensors or electromagnetic acoustic transducers ("EMAT") sensors. Wireless devices may prevail to accommodate relative movement of parts, for example, where the sensor 128 mounts to the plug 120 (as show in FIG. 4 above). In one implementation, the property-sensitive device 130 may reside in a carrier block 132, preferably made of metal or like material. The carrier block 132 may have a closed end 134 that "covers" the device 130. Preferably, material properties (like thickness or composition) do not interfere with the property-sensitive device 130. The closed end 134 may result from a material layer 136 that is disposed on the carrier block 132. Additive manufacturing techniques may prove useful for this purpose. For example, ultrasonic additive manufacturing (or "UAM") may deposit a thin, metal foil onto the carrier block 132 that does not interfere with or disrupt operation of Hall effect sensors (or the property-sensitive device 130, generally).

Figure 6:
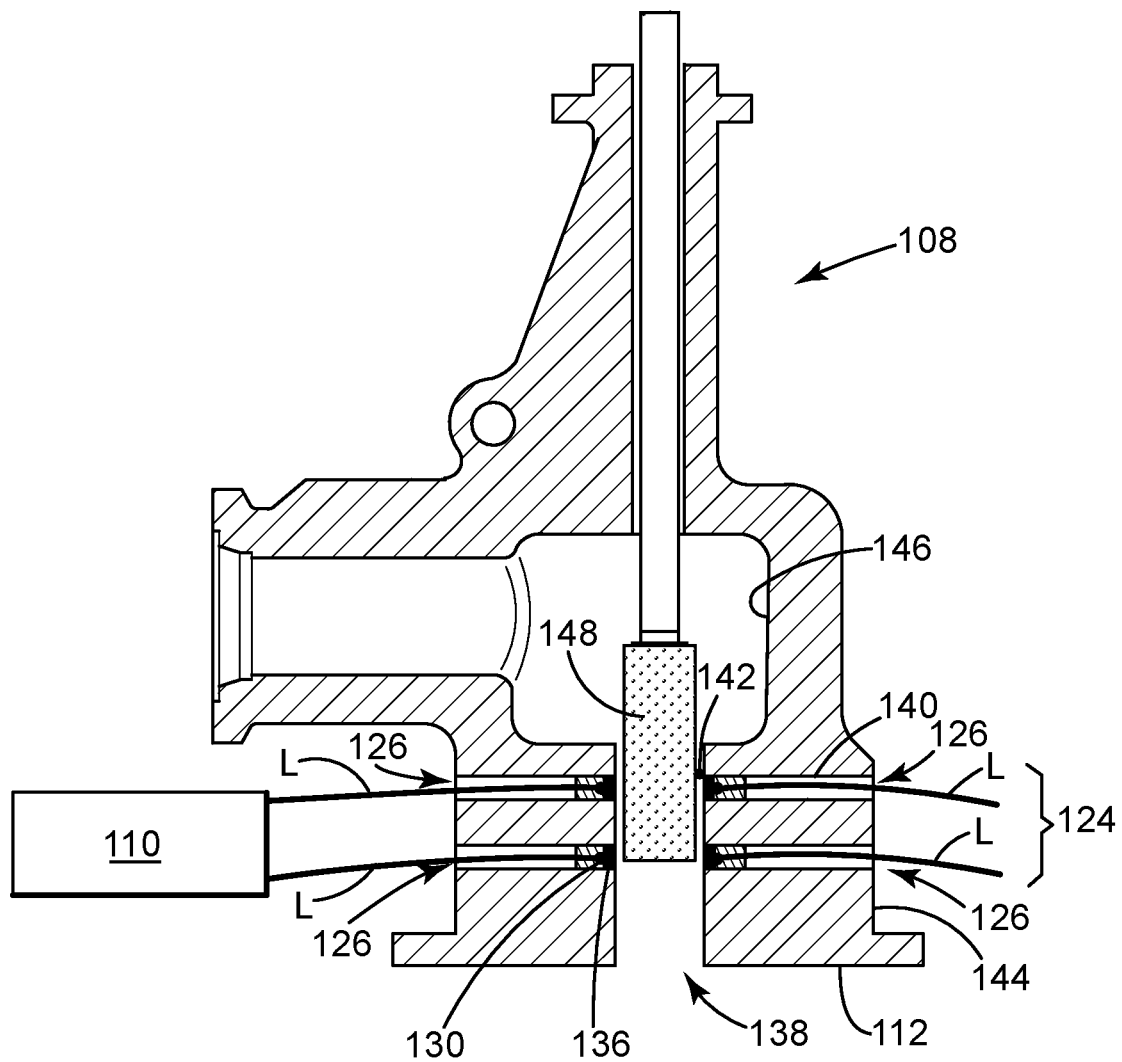
FIG. 6 depicts an elevation view of the cross-section of structure for the monitoring unit of FIG. 1.

FIG. 6 depicts an elevation view of the cross-section of structure for the flow control 108. The valve body 112 may have a bore 138 to receive the plug 120. The carrier block 132 may insert into an aperture 140, shown here as a through-hole that penetrates through the valve body 112 to the bore 138 to form openings 142. Leads L from the property-sensitive device 130 may extend from the opening 142 at an outer surface 144 to connect with the valve positioner 110. The material layer 136 may reside at the opening 142 at an inner surface 146. This arrangement locates that property-sensitive device 130 in proximity to the plug 120. The thin, metal foil protects it from flow of material 104. In one implementation, a coating 148 disposed on the plug 120 may stimulate the property-sensitive device 130 to generate a signal. For Hall effect sensors, the coating 148 may have a composition that contains metal. In service, the coating 148 may erode or wear away to expose the underlying material of the plug 120. This underlying material would not stimulate the property-sensitive device 130, thus changing, or in some cases extinguishing, the signal from the Hall effect sensor. Processes at the valve positioner 110 or DCS may generate an output in response to any changes that occur in (or absence of) the signal. This output may alert operators to condition of the plug 120 that require attention or maintenance.

Figure 7:
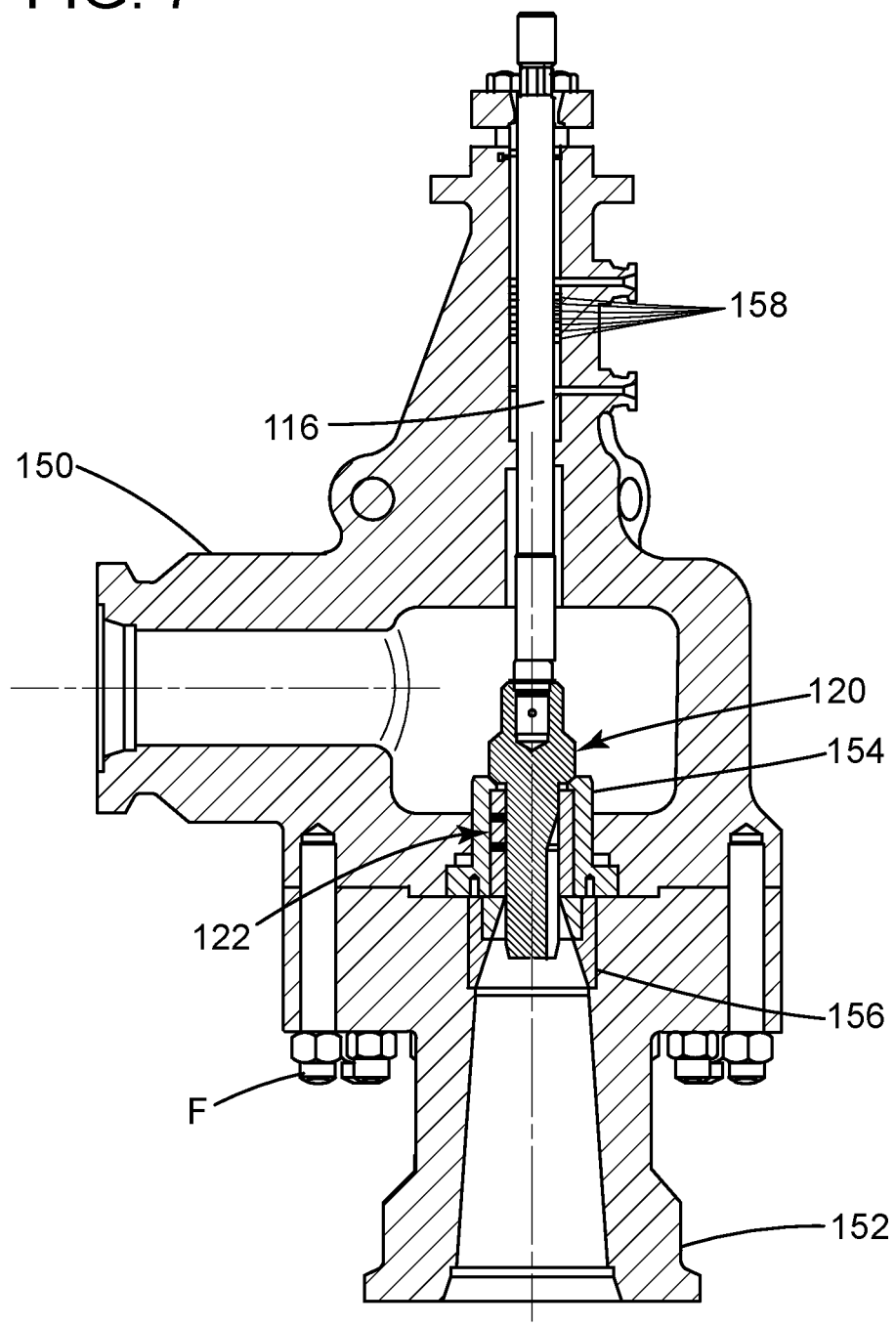
FIG. 7 depicts an elevation view of the cross-section of structure for a flow control.

FIG. 7 depicts an elevation view of the cross-section of structure for the flow control 108. This structure comprises an upper member 150 that secures with a lower member or "flange" 152. Fasteners F, like nuts and bolts, may work for this purpose. As shown, the seat 118 may comprise a seat ring 154. A venturi housing 156 may reside in the flange 152 below the seat ring 154. In one implementation, the valve stem 116 may extend through packing 158 in the upper member 150 to locate the plug 120 in proximity to a seat ring 154. Construction of the packing 158 is useful to allow movement of the valve stem 116, but prevent the flow control 108 from emitting fugitive emissions. It may prove useful that the upper member 150 include the sensing location 126, as well. This feature may provide data that reflects conditions on the valve stem 116. In one implementation, the sensor 122 at this location may generate signals that can reflect position of the plug 120. Processing of these signals may provide feedback to the DCS that the flow control 108 has achieved its designated setpoint.

In view of the foregoing, the improvements herein address operator concerns about life expectancy of certain parts on their process lines. The embodiments can monitor physical conditions of these parts, in real-time, and with a level of accuracy not available through non-invasive techniques, like ultrasonics. The resulting data and diagnostic analysis can prove operators with a picture of wear characteristics. This picture can allow them to act quickly or timely to avoid catastrophic failures that might reduce produce quality or cause unfortunate (and costly) shutdowns of their process lines.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve, comprising:
   a valve plug with a surface having a coating disposed thereon;
   a valve body having a flow path to receive the valve plug;
   a carrier block resident in the valve body;
   a sensor unit resident in the carrier block, the sensor unit generating a signal that changes in response to surface defects in the coating on the surface of the valve plug; and
   a metal foil interposed between the sensor unit and flow in the flow path,
   wherein the metal foil is configured to protect the sensor unit from flow in the flow path but not interfere with operation of the sensor unit.

2. The valve of claim 1, wherein the sensor unit has a sensing location that generates a field into the flow path that interacts with the surface to generate the signal.

3. The valve of claim 1, wherein the sensor unit has more than one sensing location that generates a field into the flow path that interacts with the surface to generate the signal.

4. The valve of claim 1, wherein the sensor unit comprises a property-sensitive device that generates the signal.

5. The valve of claim 1, wherein the sensor unit comprises a property-sensitive device that generates the signal in response to changes in a field that penetrates through the metal foil.

6. The valve of claim 1, wherein the sensor unit comprises a Hall effect sensor in position to interact with the surface to generate the signal.

7. The valve of claim 1, further comprising:
   an aperture in valve body,
   wherein the sensor unit comprises a property-sensitive device that generates the signal, and
   wherein the carrier block resides in the aperture.

8. The valve of claim 1, further comprising:
   an aperture in the valve body with an opening at the flow path,
   wherein the the metal foil is in position at the opening.

9. The valve of claim 1, wherein the coating comprises metal.

10. The valve of claim 1, wherein the signal changes in response to an area at which the defect exposes the surface of the valve plug.

11. A valve, comprising:
    a valve plug with a surface having a coating disposed thereon;
    a valve body having a flow path to receive the valve plug;
    a carrier block resident in the valve body;
    a property-sensitive device resident in the carrier block, the property-sensitive devices configured to generate a field that interacts with the coating to generate a signal that changes in response to surface defects in the coating on the surface; and
    a metal foil interposed between the property-sensitive device and flow in the flow path,
    wherein the metal foil is configured to protect the sensor unit from flow in the flow path but not interfere with operation of the sensor unit.

12. The valve of claim 11, wherein the property-sensitive device comprises a Hall effect sensor.

13. The valve of claim 11, wherein the field comprises a magnetic field.

14. The valve of claim 11, wherein the coating comprises metal.

* * * * *